United States Patent
Edwards et al.

(10) Patent No.: US 9,513,812 B2
(45) Date of Patent: *Dec. 6, 2016

(54) REFERENCE COUNTING FOR MEMORY AREAS

(71) Applicant: International Business Machines Corporation, Armonk, NY (US)

(72) Inventors: Ian C. Edwards, Southampton (GB); Jonathan Levell, Winchester (GB); Andrew J. Schofield, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,998

(22) Filed: Nov. 12, 2015

(65) Prior Publication Data

US 2016/0291880 A1    Oct. 6, 2016

Related U.S. Application Data

(63) Continuation of application No. 14/673,907, filed on Mar. 31, 2015.

(51) Int. Cl.
  *G06F 12/00*   (2006.01)
  *G06F 3/06*    (2006.01)
  *G06F 12/02*   (2006.01)

(52) U.S. Cl.
  CPC .......... *G06F 3/0608* (2013.01); *G06F 3/0631* (2013.01); *G06F 3/0673* (2013.01); *G06F 12/0253* (2013.01); *G06F 2212/1044* (2013.01)

(58) Field of Classification Search
  CPC .............. G06F 12/0276; G06F 12/0261; G06F 12/0269
  See application file for complete search history.

(56) References Cited

U.S. PATENT DOCUMENTS

| | | | |
|---|---|---|---|
| 7,194,495 B2 | 3/2007 | Moir et al. | |
| 8,250,047 B2 | 8/2012 | McKenney et al. | |
| 8,402,224 B2 | 3/2013 | Bruening et al. | |
| 8,677,076 B2 | 3/2014 | Dice et al. | |

(Continued)

OTHER PUBLICATIONS

Appendix P—List of IBM Patents or Patent Applications Treated as Related, Filed Nov. 12, 2015, 2 pages.

(Continued)

*Primary Examiner* — Aimee Li
*Assistant Examiner* — Hannah A Faye-Joyner
(74) *Attorney, Agent, or Firm* — Steven F. McDaniel; David B. Woycechowsky

(57) ABSTRACT

Technique for analyzing memory areas based on local copies of a global counter by: (i) determining a plurality of currently-executing fast threads and a plurality of currently executed slow threads; (ii) intermittently incrementing a global counter variable to have a current global counter value; (iii) intermittently setting the local counter of the data set for each fast thread of the plurality of fast threads to be equal to the current global counter value; (iv) determining that no slow threads of the plurality of slow threads reference the first memory region; (v) assigning a free-after value to the first memory region; (vi) determining whether the free-after value of the first memory region is less than or equal to all of the local counters of the fast thread data sets of the plurality of fast threads; and (vii) de-allocating the first memory region.

6 Claims, 5 Drawing Sheets

(56) References Cited

U.S. PATENT DOCUMENTS

2004/0107227 A1    6/2004   Michael
2011/0264712 A1   10/2011   Ylonen
2014/0237004 A1    8/2014   Schreter

OTHER PUBLICATIONS

Andreasson, Eva, "JVM performance optimization, Part 3: Garbage collection", Javaworld, Oct 10, 2012, <http://www.javaworld.com/article/2078645/java-se/jvm-performance-optimization-part-3-garbage-collection.html>.

Edwards et al., "Reference Counting for Memory Areas", U.S. Appl. No. 14/673,907, filed Mar. 31, 2015.

"Hazard pointer", Wikipedia, the free encyclopedia, p. last modified on Dec. 11, 2014 at 05:33, <http://en.wikipedia.org/wiki/Hazard_pointer>.

IBM, "IBM MessageSight V1.2 and MessageSight Virtual Edition V1.2 deliver mobile and machine-to-machine communication within and beyond the enterprise", IBM United States Software Announcement 214-440, dated Oct. 21, 2014, Planned availability Date: Nov. 21, 2014, pp. 1-13, Grace Period Disclosure Document.

_US 9,513,812 B2_

REFERENCE COUNTING FOR MEMORY AREAS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "IBM MessageSight V1.2 and MessageSight Virtual Edition V1.2 deliver mobile and machine-to-machine communication within and beyond the enterprise", IBM United States Software Announcement 214-440, Oct. 21, 2014, availability Date: Nov. 21, 2014.

BACKGROUND OF THE INVENTION

The present invention relates generally to the field of computer memory analysis, and more particularly to de-allocation of memory portions suitable for putting into a "freed" status.

"Reference counting" is a technique of storing the number of references (also called, pointers, or handles) to a resource, such as an object, a block of memory, a portion of disk space or other resource. Some garbage collection algorithms use forms of reference counting. Generally speaking, reference counting uses a set of numerical variables, called "reference counts," to de-allocate objects (for example, memory blocks) based upon whether the object associated with a given reference count is no longer being referenced by any referencing entities (for example, threads of access to data). In the context of a collection algorithm, reference counting tracks, for each object, a count of the number of references to it held by other referencing entities. If an object's reference count reaches zero, the object is no longer being accessed (typically meaning that the object can be freed for other uses, de-allocated and/or destroyed).

As mentioned above, one conventional way to track when a memory block can be freed (that is, de-allocated) is via reference counting. When a thread of access to data (note, throughout this document, unless otherwise explicitly noted, "threads" will refer to threads of access to data, rather than threads of execution of instructions) has a need to access a given memory block, that thread increments the reference count associated with the given memory. The thread subsequently decrements the associated reference count when the thread will no longer require access to the given memory block. Typically, this incrementing and decrementing of reference counts is visible to all threads and is "atomic." On a modern CPU (central processing unit), such globally-visible atomic changes to the reference count will require memory barriers (to ensure the change is visible to other threads) and have associated, non-negligible cost for many use cases.

SUMMARY

According to an aspect of the present invention, there is a method, system and/or computer program product for performing the following operations (not necessarily in the following order): (i) determining a plurality of currently-executing fast threads and a plurality of currently executed slow threads, with each fast thread of the plurality of fast thread respectively having a fast thread data set associated therewith, and with each fast thread data set including a local counter value; (ii) intermittently incrementing a global counter variable to have a current global counter value; (iii) intermittently setting the local counter of the data set for each fast thread of the plurality of fast threads to be equal to the current global counter value; (iv) for a first memory region, determining that no slow threads of the plurality of slow threads reference the first memory region; (v) responsive to the determination that no slow threads reference the first memory region, assigning a free-after value to the first memory region, with the free-after value of the first memory region being equal to the current value of the global counter; (vi) for the first memory region, determining whether the free-after value of the first memory region is less than or equal to all of the local counters of the fast thread data sets of the plurality of fast threads; and (vii) on condition that the free-after value of the free-after value of the first memory region is less than or equal to all of the local counters of all of the fast thread data sets, de-allocating the first memory region.

DETAILED DESCRIPTION

Figure 1A:
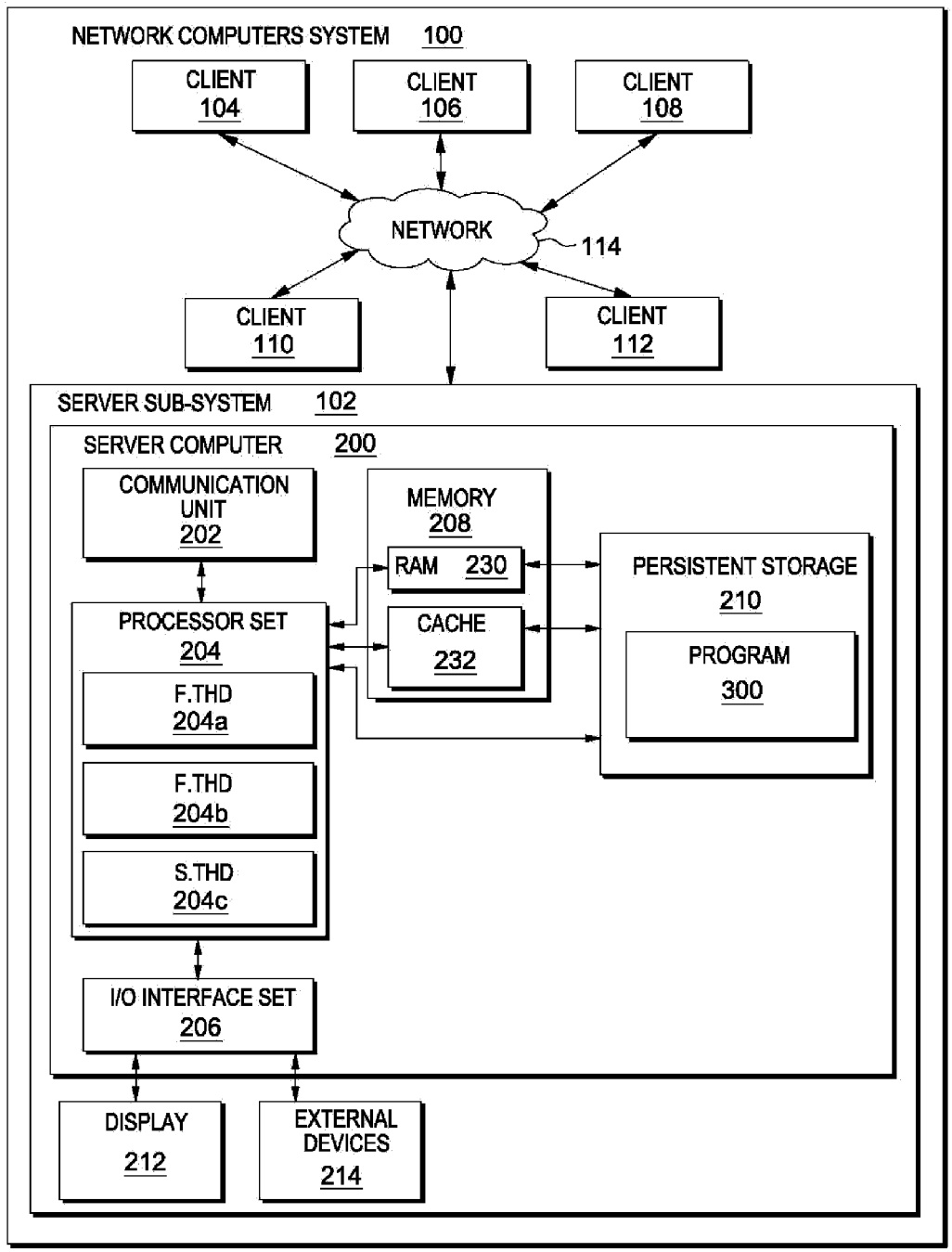
FIGS. 1A and 1B, taken together, are a block diagram of a first embodiment of a system according to the present invention.

Some embodiments of the present invention are directed to a technique that allows a multitude of threads (note, throughout this document, unless otherwise explicitly noted, "threads" will refer to threads of access to data, rather than threads of execution of instructions) to access memory blocks concurrently and to determine when a memory block will no longer be accessed by any thread and can therefore be "freed" (that is, de-allocated).

Some embodiments of the present invention are directed to a method of analyzing memory areas based on local copies of a global counter. The memory categories are determined: (i) in response to determining that the category is a thread or data structure that will refer to memory region(s) for a relatively long period of time; and (ii) in response to determining that the category is a thread or data structure that will refer to memory region(s) for a relatively short period of time. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100, including: server sub-system 102; client sub-systems 104, 106, 108, 110, 112; communication network 114; server computer 200; communication unit 202; processor set 204 (including fast threads 204a, b and slow thread 204c); input/output (I/O) interface set 206; memory device 208; persistent storage device 210; display device 212; external device set 214; random access memory (RAM) devices 230; cache memory device 232; and program 300.

While some embodiments will be discussed in the context of the server/client architecture of networked computers system 100, it is noted that methods and/or systems according to the present invention are not so limited and may be applied, for example, to stand-alone computers.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
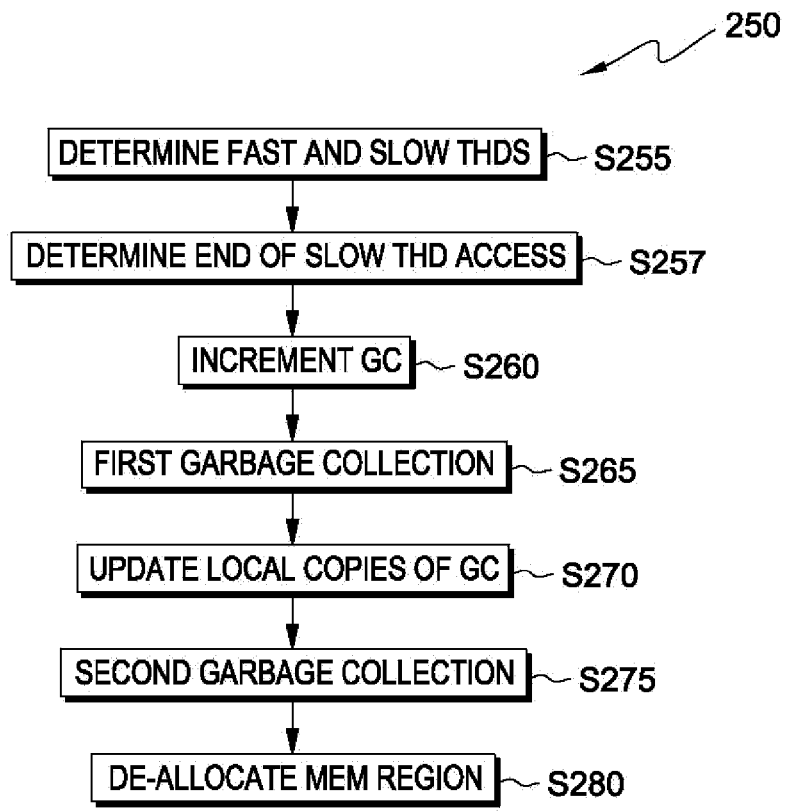
FIG. 2 is a flowchart showing a first embodiment of a method according to the present invention.
Figure 3:
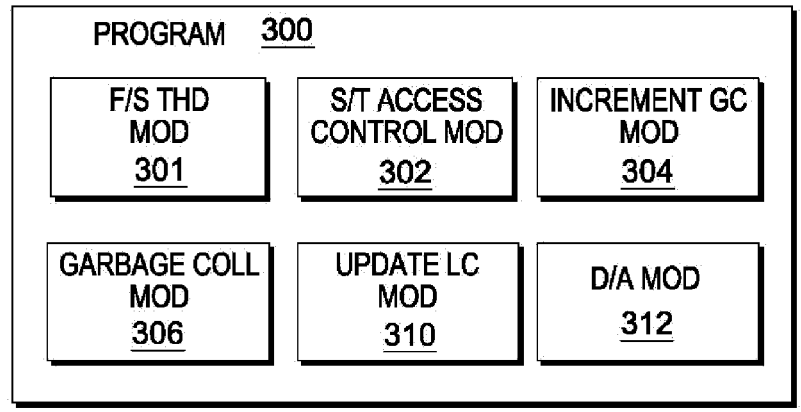
FIG. 3 is a block diagram of machine logic (for example, software) used in the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where fast/slow thread module ("mod") 301 determines which threads running in processor(s) set 204 (see FIG. 1A) are fast threads, and which threads are slow threads. In the next sub-section of this Detailed description section, there will be further discussion of fast and slow threads, including discussion of fast versus slow threads in certain processing contexts (for example, a processor executing publish/subscribe threads in a publish/subscribe software context). At this point it should be understood that fast threads are threads of access to data that are determined to require brief access to data relative to the period of access required by slow threads. As will be discussed, the method of flowchart 250 will determine whether a given memory region is ready for de-allocation in two different ways respectively with respect to: (i) fast threads; and (ii) slow threads.

As shown in FIG. 1A, in this example, there are two fast threads 204a, b and one slow thread 204c. In this relatively simple example of the method of flowchart 250, this fast versus slow thread is shown as the first operation block of flowchart 255. However, it should be understood that in most embodiments of the present invention, this determination of fast versus slow threads will be occurring on an ongoing basis as new threads (both fast and slow) are constantly introduced over time.

Figure 1B:
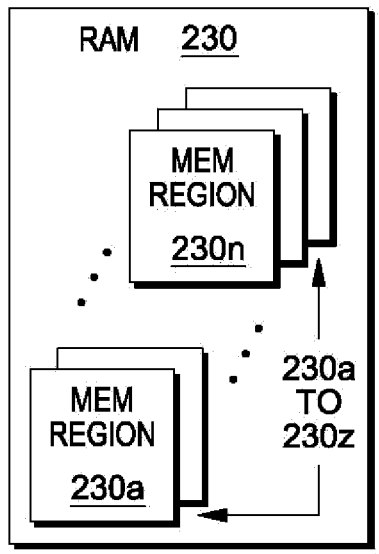

Processing proceeds to step S257, where slow-thread access control module ("mod") 302 determines that first memory region 230n is no longer going to be accessed by any of the slow threads. (See definition of "memory region," below; memory regions 230a to 230z are shown in FIG. 1B.) In this simple example, the only slow thread is thread 204c (see FIG. 1A), and this thread makes no references to memory region 230n, meaning that region 230n will no longer be accessed by any slow threads, which, in turn, means that memory region 230n can be de-allocated with respect to the slow threads (but it does not necessarily mean that region 230n can be de-allocated with respect to the fast threads).

In some variations on this embodiment, the slow-thread access control mod makes its determination that memory region 230n is no longer going to be accessed by slow threads based on conventional reference counting, as described, above, in the Background section, and further described, below, in the next sub-section of this Detailed Description section.

Processing proceeds to step S260, where increment global counter mod 304 increments global counter variable from GC=124 up to GC=125. GC is an "unsigned" variable. In this embodiment, when GC is being changed, GC is updated using a memory barrier (to ensure that all threads of execution pick up the newer value as they start to execute). However, when a local copy of the global counter is taken, this does not need to be subject to a memory barrier. Mod 304 also saves the new incremented value for GC (that is, 125) as a free-after(n) variable (or FA(n)) value associated with memory region 230n. This FA(n) value for region 230n will help determine when region 230n: (i) is no longer needed by any fast threads; and (ii) can therefore be de-allocated.

Processing proceeds to step S265, where garbage collection mod 306 makes a first check to determine whether memory region 230n can be de-allocated. More specifically, this check is accomplished by determining whether any of the fast threads have a local counter (or LC) value that is less than the FA(n) value corresponding to memory region 230n. In this example, the LC(a) value for local counter of fast thread 204a is equal to 124, and the LC(b) value for local counter of fast thread 204b is equal to 124. This is because the local copies of the global counter (GC) have not been updated since the time the GC counter was incremented at step S260.

In this example, because there is at least one LC(x) value that is less than FA(n), mod 306 determines that memory region 230n cannot be de-allocated. This is because fast thread(s) (in this example 204a and 204b), which have not had their local copies of the GC (in this example, LC(a) value and LC(b) value, respectively) updated, may have developed a need to access memory region 230n when: (i) slow threads were still using memory region 230n (that is, the time of step S255); or (ii) after the slow threads were finished with memory region 230n, but before that information could be effectively communicated to some of the fast thread(s) (that is, the time between the end of step S255 and the beginning of step S265). The effective communication, to fast threads, that slow threads are finished with a memory region is discussed, with reference to an example involving a hash table, below, in the next sub-section of this Detailed Description section.

Processing proceeds to step S270 where update LC mod 310 copies the current GC value as the LC value for all active fast threads. In this example, the current GC value is 125, and this value is copied to; (i) LC(a), stored as part of thread data for fast thread 204a; and (ii) LC(b), stored as part of thread data for fast thread 204b. In this embodiment, when these updates to the LC counters are being made, mod 310 further ensures that any memory accesses, by fast threads to currently allocated memory regions, are completed by the time the local counters are updated with the current GC value.

Before proceeding to the next step, it is noted that the embodiment under discussion, in which every active fast thread has a local copy of the GC, and further in which all local copies of the GC are updated to current GC value in a single step (that is, step S270), is not necessarily a preferred embodiment. Rather, the embodiment under discussion has been designed for reduced complexity and to facilitate reader understanding. In some other (perhaps more preferred) embodiments of the present invention: (i) fast threads only get local copies of the GC when they are engaging in access of allocated memory regions; (ii) not all of the fast threads (or, more accurately, not all of the fast threads that have local copies of the GC) have their local copies updated at the same time; and/or (iii) when a given fast thread is finished with engaging in access of allocated memory region(s), then the given fast thread loses its local copy of the GC. These kinds of embodiments will be discussed in more detail, below, in the Further Comments And/Or Embodiment(s) sub-section of this Detailed Description section.

Processing proceeds to step S275, where garbage collection mod 306 makes a second check to determine whether memory region 230n can be de-allocated Like the previously-described check of step S265, this check is accomplished by determining whether any of the fast threads have a local counter (or LC) value that is less than the FA(n) value corresponding to memory region 230n. Because of the local counter updates at step S270, the LC(a) value for local counter of fast thread 204a is now equal to 125, and the LC(b) value for local counter of fast thread 204b is now equal to 125. This means that there is no LC(x) value that is less than FA(n), but, rather, GC=LC(a)=LC(b)=FA(n)=125. Because no LC(x) value is less than FA(n), at step S275, mod 306 determines that memory region 230n can be de-allocated.

Processing proceeds to step S280 where de-allocation mod 312 de-allocates memory region 230n, thereby freeing this memory for other uses.

III. Further Comments and/or Embodiments

Some embodiments of the present invention may include one, or more, of the following characteristics, features and/or advantages: (i) particularly suited when very fast access is required to a set of memory blocks and memory blocks are not freed very often; (ii) optimizes fast access at the expense of making freeing memory more complex and less timely; (iii) suitable for use case that involves configuration in a firewall (firewall rules are only changed infrequently but packets need to be analyzed against a very complex set of rules very quickly); and/or (iv) suitable for use with memory blocks representing the configuration in a publisher/subscriber (pub/sub) broker. Further with respect to item (iv) in the preceding list, just as in a firewall, configuration (for example, maximum reliability for messages published on a topic A or maximum number of messages buffered for subscriptions on topic B) will be changed very infrequently compared to the potentially millions of times a second these configuration rules are accessed as publications flow through the system.

Some embodiments of the present invention use a global integer counter (sometimes herein referred to as a "deletion-state counter"). The deletion-state counter is increased whenever a memory block should no longer be used. Threads keep their own copy of the deletion-state counter. When deciding whether memory can be freed, the deletion-state counter at the time the memory block should no longer be used is compared with each thread's private copy of the deletion-state counter. If all threads are up-to-date enough that they are aware that a memory region is no longer in use then that memory region can be freed without affecting any thread. These embodiments provide a system based on local copies of a global counter being used to determine when memory can be freed. Some of these deletion-state counter embodiments further additionally include reference counting.

Memory usage can be helpfully categorized into two categories: (a) a "thread" (see definition of "thread," below in the Definitions sub-section of this Detailed Description section) that will refer to "memory region(s)" (see definition of "memory region," below in the Definitions sub-section of this Detailed Description section) for a relatively long period of time; and (b) a thread that will refer to memory region(s) for a short period of time. For category (a), the overhead of reference counting tends to be small and some embodiments will use conventional reference counting for category (a) threads.

Figure 4:
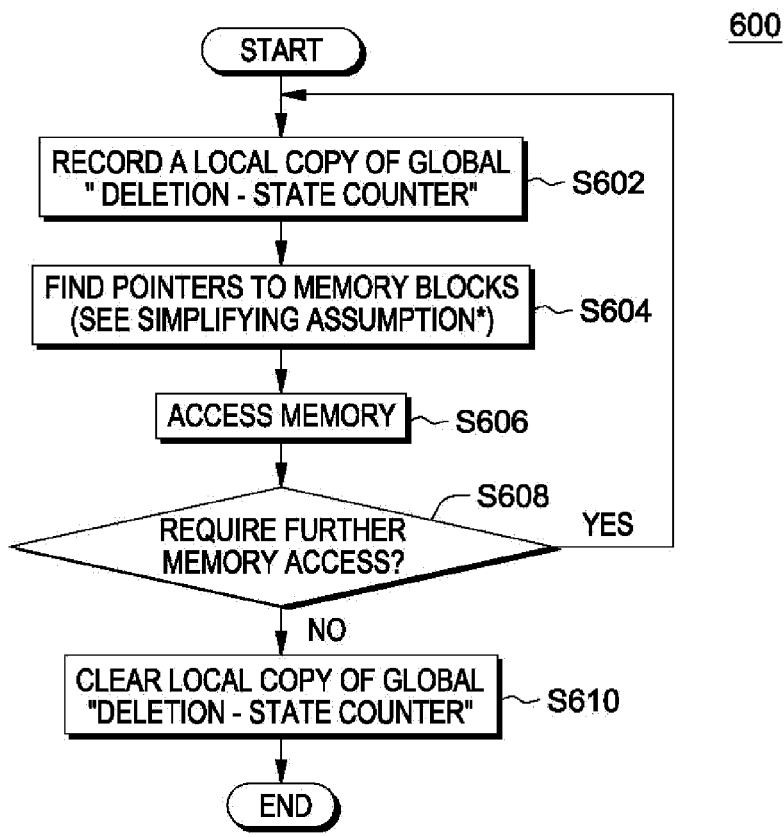
FIG. 4 is a flowchart showing a second embodiment of method according to the present invention.

For example, in some embodiments used to implement a pub/sub broker, conventional reference counting is used for subscription threads. Each subscription that refers to a piece of memory contributes +1 to the reference count for a memory region, and that memory region cannot be freed (that is, de-allocated) until all subscriptions (and everything else) that refers to that memory region has been updated and the corresponding count reduced by 1. On the other hand, category (a) threads, in this pub/sub example, are controlled, with respect to memory region de-allocation, in a different way. If a category (b) thread needs to access a given memory region only briefly, it does so without increasing and decreasing reference counts on that memory region, as shown in flow chart 600 of FIG. 4. As shown in FIG. 4, flowchart 600 includes the following operations, with process flow among and between the operations as shown by arrows in FIG. 4: S602; S604; S606; S608; and S610. The method of flowchart 600 will be discussed in more detail in the following paragraphs.

At operation S602, before accessing the memory regions, a thread takes a copy of the previously mentioned deletion-state counter (in this embodiment an integer counter).

At operation S604, the thread then locates any memory region(s) it needs. Operation block S604 has an asterisk (*) at this point, to represent the fact that a simplifying assumption is temporarily being made for discussion purposes. Initially, consider the case that the way threads locate memory is by referring to a data-structure (for example, a hash-table) which contributes to the reference count of the memory blocks in it. This case simplifies matters greatly (and applies to embodiments that implement a pub/sub broker). With this simplifying assumption, once the reference count on a region of memory reaches 0, it is effectively determined that no new thread will start to access that memory region because a refcount of 0 implies that that memory region has already been removed from the data structure (for example, hash table) used to find memory regions.

At operation S606, after location of the memory region(s), the thread performs whatever actions based on the memory it needs to.

At operation S608, once the thread gets to a convenient point and the thread no longer needs the memory region(s) it is using (or can re-obtain pointers to them), then processing loops back to operation S602, where the thread updates its local copy of the deletion-state counter. On the other hand, if it is determined during operation S608 that the thread has no more need to refer to the memory region(s), then processing proceeds to operation S610, where the thread clears its local copy of the counter(s) for those memory region(s).

A pub/sub broker embodiment will now be further discussed. Assume that a first thread is generated for the purpose of publishing an incoming message to relevant subscribers. Before the first thread starts a publish operation, the first thread: (i) copies the deletion-state counter (in this embodiment, an unsigned 64-bit integer); (ii) finds relevant configuration information (for example, maximum depths of affected subscriptions which can be hung off the topic tree at appropriate points with the topic tree contributing to its reference count); (iii) performs the publication; and (iv) updates its local copy of the deletion-state counter before starting the next publish.

Figure 5:
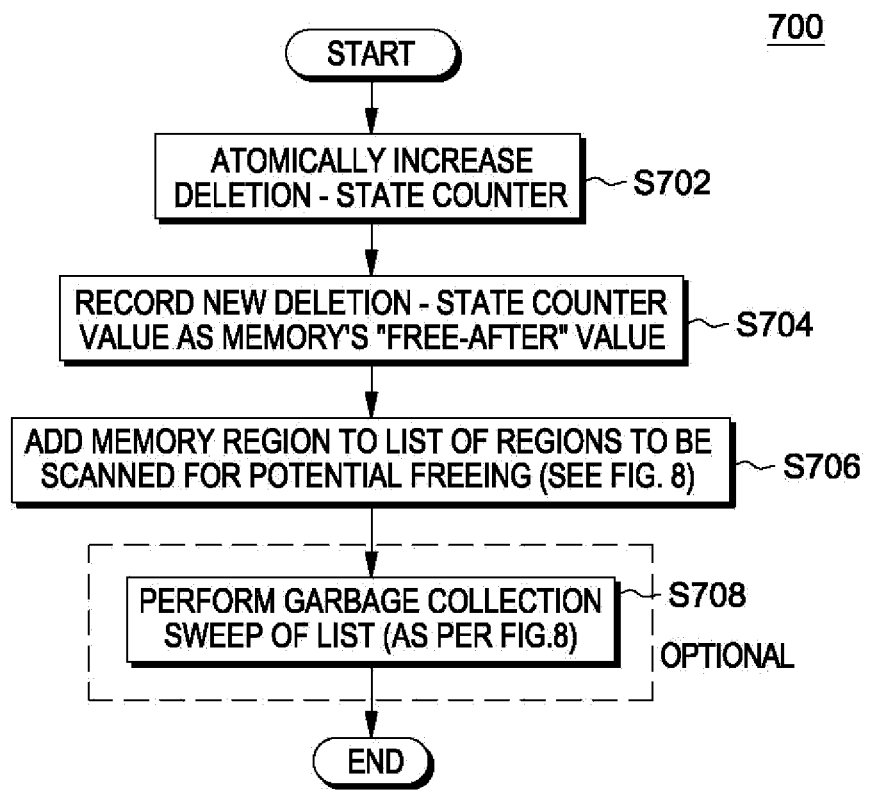
FIG. 5 is a flowchart showing a third embodiment of method according to the present invention.

The way in which memory becomes "freed" in this pub/sub broker embodiment will now be discussed. With conventional reference counting, memory region(s) can be freed as soon as the refcount reaches 0. In this embodiment, once the reference count reaches 0, the relevant memory region(s) can be freed once it has been determined that there is no "category B" memory usage. This process is described in flowchart 700 of FIG. 5. As shown in FIG. 5, flowchart 700 includes the following operations, with process flow among and between the operations as shown by arrows in FIG. 5: S702; S704; S706; and S708. The method of flowchart 700 will be discussed in more detail in the following paragraphs.

At operation S702, once the refcount reaches 0, the thread that removed the last refcount, for a given memory block, increases the global deletion-state counter.

At operation S704, the new value is then recorded in the memory block as its "free-after" value (once all threads have a local copy of the deletion-state counter the same as or higher than the memory block's associated "free-after value" then the memory block can be safely freed).

At step S706, once the memory block has a free-after value, the block is appended to a list of memory to consider for garbage collection.

Some embodiments further perform garbage collection, as shown at operation S708.

Figure 6:
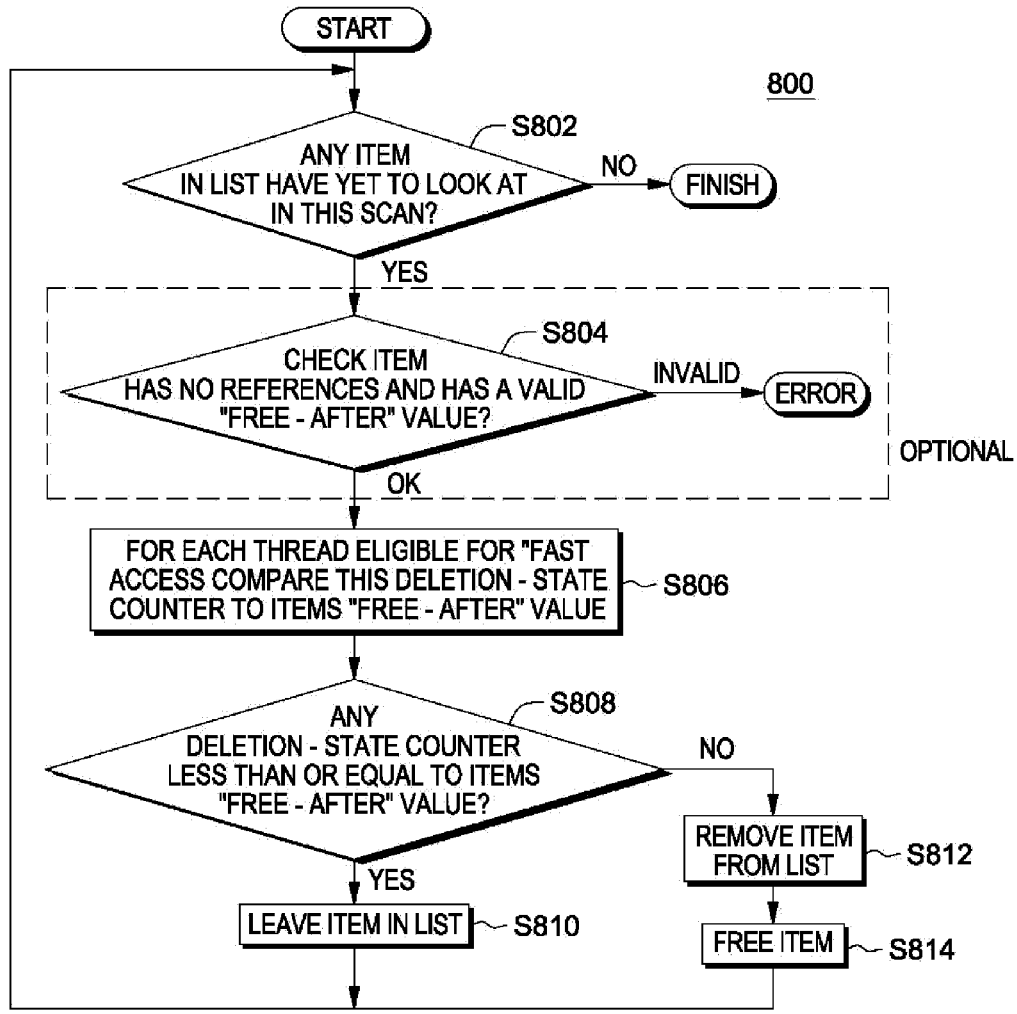
FIG. 6 is a flowchart showing a fourth embodiment of method according to the present invention.

The process of doing the garbage collection is described in flowchart 800 of FIG. 6. As shown in FIG. 6, flowchart 800 includes the following operations, with process flow among and between the operations as shown by arrows in FIG. 6: S802; S804; S806; S808; S810; S812; and S814. The method of flowchart 800 will be discussed in more detail in the following paragraphs.

During garbage collection according to an embodiment of the present invention, operations of S802 to S814 are selectively performed according to the process flow shown in FIG. 6 for each item (for example, memory region).

At operation S808, a given memory region has its free-after value compared with all local copies of the deletion-state counter.

On condition that all local copies of the deletion-counter for the given memory region are sufficiently large in value (that is, greater than or equal to the free-after value), then processing proceeds to operation S812 where that memory region is removed from the list of garbage-collection eligible items and then freed at operation S814.

In the embodiment under discussion, scans of this list are only performed immediately after a memory item is added to the list (at optional step S804). Often this means that a recently-added memory region cannot yet be freed (and periodic scans of the list would quickly be able to free it) but the CPU-cost of more regular list scans is a much bigger concern that the memory overhead of a single extra memory region in the list.

Some possible variations on the above-describe embodiments will now be discussed in the following paragraphs.

WRAPPING OF THE GLOBAL COUNTER: Unsigned Integers on a computer are fixed size and wrap back to 0 if they become larger than can be accommodated. In practice on a modern computer, this is not an issue, on most systems, integers can be up to 2^64 (two raised to the power of 64) in size. Imagining a number that large is hard. If it were desired to free a memory segment a million times a second then it would be more than 500,000 years before the counter wrapped (and the counter could be reset by restarting the system). If it did need to be addressed then one solution would be to have a way to pause all threads (say every thousand years), remove anything no longer required in the deferred free list then subtract the smallest per-thread copy of the global counter from all copies of the counter (including the free-after values in memory regions on the garbage collection list).

Now that the topic of freeing old memory sections has been discussed, the topic of alterations to old memory sections will be addressed. Alterations fall into two categories as will be identified in the following paragraphs.

CATEGORY (a): Alterations that are atomic (for example, updating integers at fixed offsets inside the segment). As long as stale configuration values are not an issue on short time scales (for example, on a scale of microseconds) then these can be ignored. If old configuration values can be critical then the system designer should provide for this criticality in an appropriate way, as will be appreciated by those of skill in the art.

CATEGORY (b): Includes two approaches as follows:

APPROACH (i): Treat the altered data as a new memory segment, update references to the old segment (for example, in the hash table that matches incoming messages to a config segment) to point to the new segment. This approach may not work well when there are many references to a segment that can be difficult, or even impossible, to find and update.

APPROACH (ii): For each non-atomic entity in a configuration segment that may get updated, create a separate segment (called a "sub-segment") which is only referred to (use-count of 1 either implicitly or explicitly) by the parent "config" segment. When it is desired to alter the value in the parent "config" segment: (A) create a new sub-segment for the new value; (B) update the config segment to refer to the new segment (so it has a usecount of 1) and decrease the use-count of the old sub-segment, which will cause it to get put into the "deferred delete" list and protected from early deletion by the same "global counter" mechanism that applies to config segment.

Above, a simplifying assumption was made. That simplifying assumption was that references to memory regions are always acquired from a data structure (like a hash table) such that the reference will necessarily contribute to the conventional reference count of the memory region. Under this simplifying assumption, no new threads can start referring to an object once it has a zero reference count. However, some embodiments do not rely on this assumption. In these embodiments, a thread with a local version of the deletion-state counter prevent a particular piece of memory (usecount 0) from expiring. For example, give a pointer to that memory region to another thread as long as the first thread doesn't reset its view of the global counter until either: (i) the second thread stopped using it; or (ii) the second thread ensured its global counter copy was early enough to prevent the memory being freed. Taken to an extreme, all objects could have no usecount and be added to the "to-be-freed" list on allocation—but long lived memory objects would prevent any memory allocated after them (that is, at a higher version of the global counter) to be freed, which is unlikely to be useful in most cases.

Some of the embodiments described above are specific to configuration in a pub/sub system. Other embodiments may be used in computer systems with different primary purposes. As an example, some embodiments may be directed to configuration in webservers or databases that are segmented (for example, by virtual host and database table, respectively).

Some embodiments of the present invention may include one, or more, of the following features, characteristics and/or advantages: (i) a mechanism that allows memory to be traded off with performance; and/or (ii) a high-level memory-locking implementation which is optimized for scenarios for which CPU (central processor unit) reference counting is not optimal.

For the period of time when threads are reading memory but not writing to it (which is common in certain light-weight, bi-directional messaging software), some embodiments do not require slow-to-update reference counts to be used. That might be for tens of millions of actions, which are therefore more performant using this system. When memory is eligible to be deleted, the scheme described is slower to delete that memory than if the system had used CPU reference counting. However, because memory region deletion is far rarer than reading the data, alternative algorithms for determining memory region de-allocation, according to some embodiments of the present invention, can provide a potentially advantageous trade-off.

Some embodiments of the present invention recognize that some threads that reference memory regions: (i) come and go frequently; and (ii) are therefore not a good fit with conventional CPU reference counting insofar as determining when de-allocation of memory blocks can occur. Some embodiments provide a way of maintaining a count of the number of these ephemeral threads currently using a memory block, but keeping that count in memory that doesn't require locking to update. This makes it much faster to access memory because locks/memory barriers aren't required. The count is effectively a "timestamp" being stored in memory local to each thread. The thread describes the time the thread started reading from memory. A thread is not allowed to access memory regions whose own "timestamp" is earlier than the threads.

In some embodiments, the system stores a "timestamp" in each block of memory. This is effectively used by the memory freeing thread (sometimes herein referred to as "garbage collection' or GC) to determine which blocks of memory are eligible to be freed. If all the publishers have a timestamp greater than the timestamp associated with a memory block, and assuming the subscriber reference count=0, the memory can be freed. As mentioned above, an important principle is that a thread cannot "go back in time" and start using a memory region marked as older than the threads current timestamp.

Because of the rule about not using memory regions earlier than the threads own timestamp, the use of memory is not perfectly efficient, but that appears to be part of the tradeoff. The GC can relatively easily determine which memory blocks have no publishers, and then free the memory.

Some embodiments of the present invention may include one, or more, of the following characteristics, features and/or advantages: (i) some threads avoid having to store a count for each memory block separately and no total reference count exists in the system; (ii) use of a "deletion state counter."

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Memory region: any portion of a memory that can be independently designated as allocated (that is, in use) or de-allocated (that is, freed).

Thread: any processing entity that can reference a memory region.

What is claimed is:

1. A method comprising:
   determining a plurality of currently-executing fast threads and a plurality of currently executed slow threads, with each fast thread of the plurality of fast threads respectively having a fast thread data set associated therewith, and with each fast thread data set including a local counter value;
   intermittently incrementing a global counter variable to have a current global counter value;
   intermittently setting the local counter of the data set for each fast thread of the plurality of fast threads to be equal to the current global counter value;
   for a first memory region, determining that no slow threads of the plurality of slow threads reference the first memory region;
   responsive to the determination that no slow threads reference the first memory region, assigning a free-after value to the first memory region, with the free-after value of the first memory region being equal to the current value of the global counter;
   for the first memory region, determining whether the free-after value of the first memory region is less than or equal to all of the local counters of the fast thread data sets of the plurality of fast threads; and
   on condition that the free-after value of the free-after value of the first memory region is less than or equal to all of the local counters of all of the fast thread data sets, de-allocating the first memory region.

2. The method of claim 1 further comprising:
   on condition that the free-after value of the free-after value of the first memory region is not less than or equal to all of the local counters of all of the fast thread data sets, maintaining the first memory region in an allocated state for possible use by any fast thread(s) having a local counter value less than the free-after value of the first memory region.

3. The method of claim 1 further comprising:
   the local counter of a data set for a fast thread of the plurality of fast threads is not set to be equal to the current global counter value until all memory region references of the fast thread have been executed.

4. The method of claim 1 wherein the determination, for a first memory region, that no slow threads of the plurality of slow threads reference the first memory region is made by reference counting.

5. The method of claim 4 wherein the intermittent incrementation of the global counter variable is performed in response to a reference count of a memory region reaching a zero value.

6. The method of claim 1 further comprising:
maintaining data identifying a plurality of allocated memory regions, including the first memory region, using a hash table; and
referencing the first memory region, by a fast thread or a slow thread, using the hash table.

* * * * *